United States Patent [19]
Ku

[11] Patent Number: 5,988,811
[45] Date of Patent: Nov. 23, 1999

[54] NOSE PADS FOR SPECTACLES

[75] Inventor: Kuo-Sheng Ku, No. 201, Kuo An Street, Tainan, Taiwan

[73] Assignees: Kuo-Sheng Ku, Tainan; Yu-teng Hsiao, Chia Yi, both of Taiwan

[21] Appl. No.: 09/085,200

[22] Filed: May 27, 1998

[51] Int. Cl.⁶ .................................................. G02C 5/12
[52] U.S. Cl. .......................................... 351/136; 351/139
[58] Field of Search .................................. 351/136–139, 351/78–81

[56] References Cited

U.S. PATENT DOCUMENTS 5,691,796  11/1997  Negishi ................................. 351/137

Primary Examiner—Huy Mai
Attorney, Agent, or Firm—Rosenberg, Klein & Bilker

[57] ABSTRACT

A nose pad for spectacles has two covering bodies for contact with the nose of a user and a pair of permanent magnets each pivotally connected with a lens frame and housed in the covering bodies. The pair of permanent magnets forms attraction toward each other such that the covering bodies of the nose pad rest firmly on the nose of the user to prevent downward displacement of the spectacles along the nose.

1 Claim, 2 Drawing Sheets

NOSE PADS FOR SPECTACLES

BACKGROUND OF THE INVENTION

A common conventional spectacles may easily slide down along the nose of a wearer when the nose of the wearer perspires, resulting in the alteration of focus point of the lens, influncing the eyesight of the wearer and deteriorate it gradually.

SUMMARY OF THE INVENTION

This invention has been devised to offer a nose pad for spectacles, capable of securing the position of spectacles on the face of a user, not readily to slide down along the nose of the user even if the nose perspire.

A nose pad for spectacles in the present invention comprises two covering bodies to contact on the nose of a user and a pair of permanent magnets pivoted to rims of the spectacles and each housed in one of the covering bodies; the permanent magnets being arranged to attract each other so that the covering bodies form a desirable pressure on the nose of the user while resting on the nose of the user to prevent displacement of the spectacles.

BRIEF DESCRIPTION OF DRAWINGS

This invention will be better understood by reference to the accompanying drawings, wherein.

DESCRIPTION OF THE PREFERRED EMBODIMENT

Figure 1:
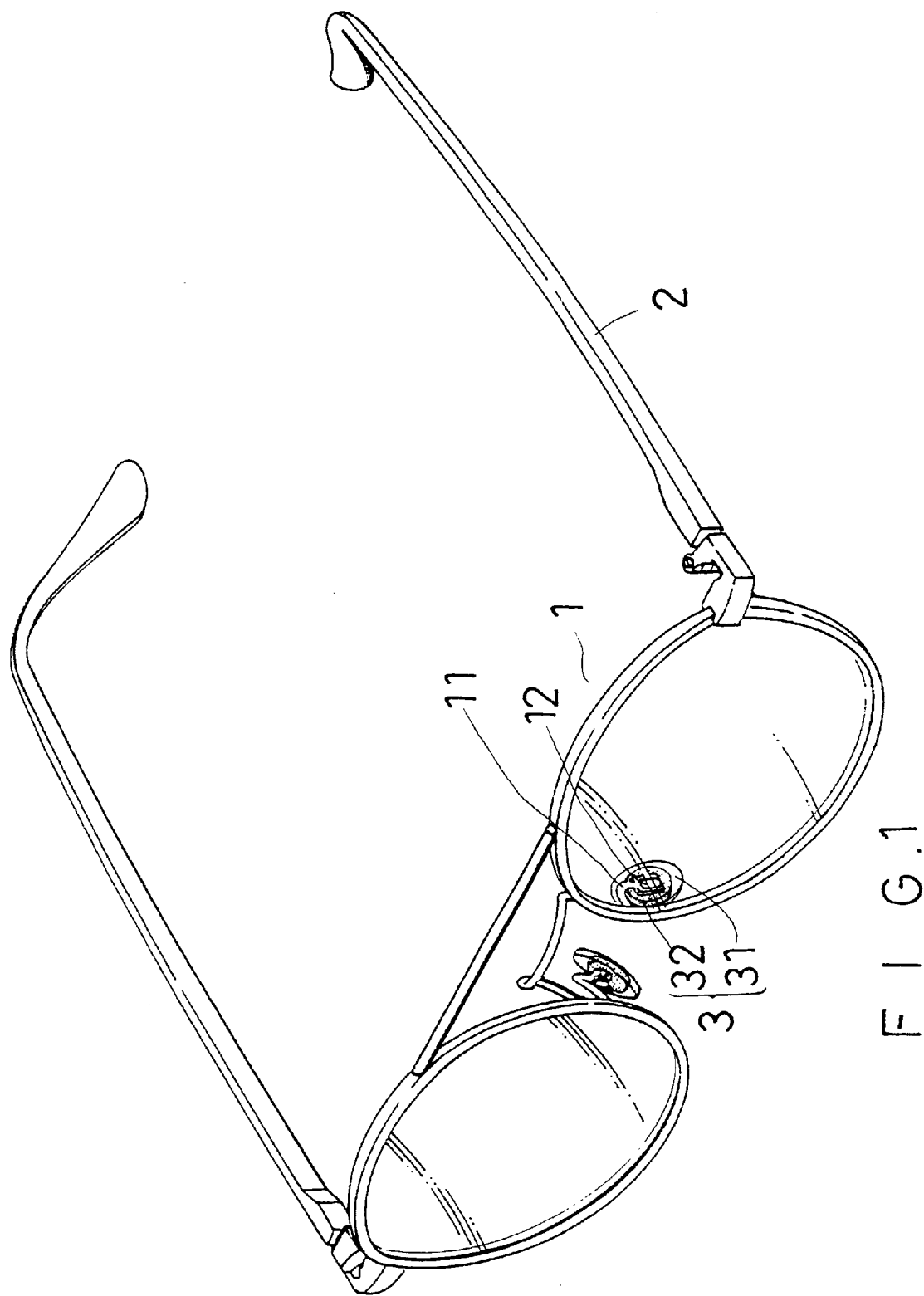
FIG. 1 is a perspective view of a nose pad for spectacles of the present invention.
Figure 2:
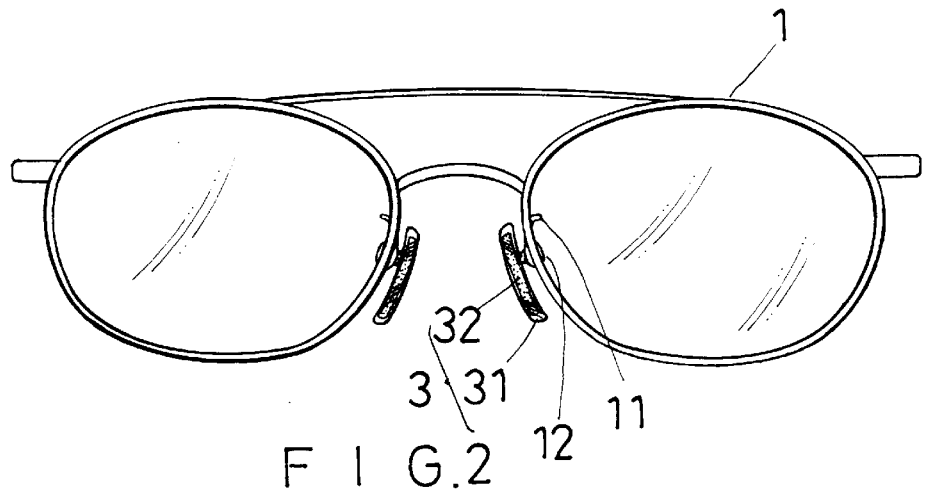
FIG. 2 is a front view of a nose pad for spectacles of the present invention.
Figure 3:
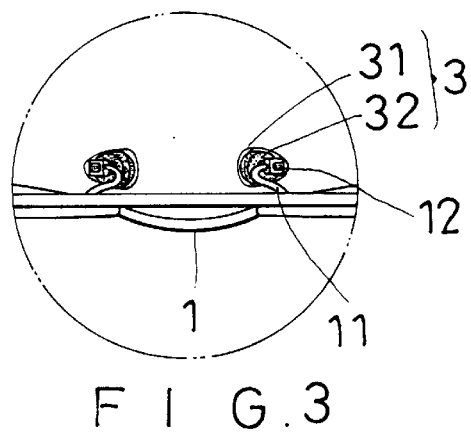
FIG. 3 is a downward view of a nose pad for spectacles of the present invention, and, FIG. 4 is an enlarged front view of a part of a nose pad for spectacles of the present invention.
Figure 4:
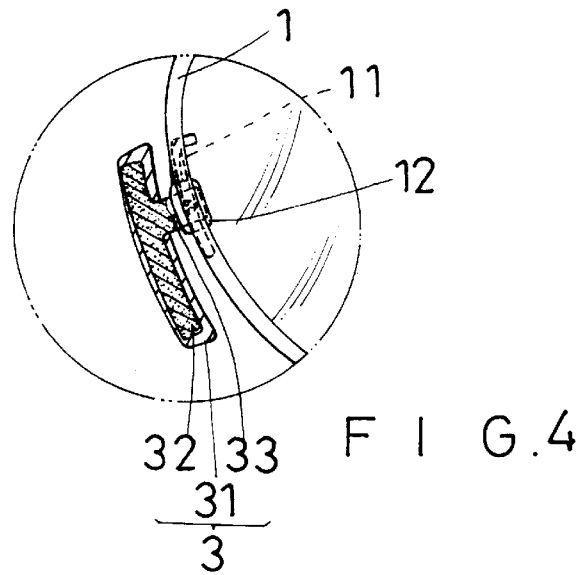

A nose pad 3 for spectacles in the present invention, as shown in FIG. 3, includes two covering bodies 31, 31, each of said two covering bodies 31 housing permanent magnets 32, 32 therein.

The spectacles in the present invention includes two temples 2, 2, a pair of rims 1,1, a pair of connecting bodies 11, 11 each connected to an inner part of each of the rims 1, and two connectors 12, 12 each formed on one end of the connecting bodies 11.

Furthermore, each permanent magnet 32 has a protruding part 33 pivotally connected to on said connector 12 of the connecting bodies 11; the permanent magnets 32, 32 attract each other.

When an user wear the spectacles with the nose pad 3 in the present invention, the covering bodies 31, 31 rest on the nose, the permanent magnets 32, 32 attracting each other and forming a force for the covering bodies 31, 31 to rest stably and firmly on the nose of the user and not permitting the spectacles to slide down when the face perspires.

As can be seen from the above description, this invention has the following advantages:

1. The permanent magnets force the two covering bodies to rest firmly on the nose of the user, letting the rim of the spectacles positioned at a definite height for the eyes of the user.

2. The covering bodies form a desirable pressure on the nose of the user so the position of the spectacles on the nose of the user is secured and the spectacles might not slide down even the nose should perspire, keeping the focus point of the lens accurate.

While the preferred embodiment of the invention has been described above, it will be recognized and understood that various modifications may be made therein and the appended claims are intended to cover all such modifications which may fall within the spirit and scope of the invention.

What is claimed is:

1. A pair of nose pads for spectacles, comprising:
   (a) a pair of permanent magnets coupled to respective rim portions of a pair of spectacles for positioning said magnets on opposing sides of a user's nose, said pair of permanent magnets being respectively poled for mutual attraction therebetween; and,
   (b) a pair of covering bodies respectively covering said pair of permanent magnets for contacting the user's nose, said mutual attraction of said permanent magnets increasing a pressure of said pair of covering bodies to the opposing sides of the user's nose and thereby resist displacement of the spectacles with respect to the user's nose.

* * * * *